United States Patent
Hosabettu et al.

(10) Patent No.: US 10,372,508 B2
(45) Date of Patent: Aug. 6, 2019

(54) METHOD AND SYSTEM FOR DYNAMICALLY INTEGRATING BOTS

(71) Applicant: Wipro Limited, Bangalore (IN)

(72) Inventors: Raghavendra Hosabettu, Bangalore (IN); Ramprasad Kanakatte Ramanna, Bangalore (IN); Raghottam Mannopantar, Bangalore (IN); Ponnusamy Ananthasankaranarayanan, Bengaluru (IN); Harihara Vinayakaram Natarajan, Bangalore (IN)

(73) Assignee: Wipro Limited, Bangalore (IN)

( * ) Notice: Subject to any disclaimer, the term of this patent is extended or adjusted under 35 U.S.C. 154(b) by 302 days.

(21) Appl. No.: 15/079,715

(22) Filed: Mar. 24, 2016

(65) Prior Publication Data

US 2017/0269972 A1  Sep. 21, 2017

(30) Foreign Application Priority Data

Mar. 17, 2016 (IN) .............................. 201641009412

(51) Int. Cl.
  *G06F 9/46* (2006.01)
  *G06F 9/52* (2006.01)
  *G06F 9/48* (2006.01)

(52) U.S. Cl.
  CPC ............... *G06F 9/52* (2013.01); *G06F 9/46* (2013.01); *G06F 9/4843* (2013.01); *G06F 9/4862* (2013.01); *G06F 9/4868* (2013.01); *G06F 2209/482* (2013.01)

(58) Field of Classification Search
  CPC . G06F 9/52; G06F 9/46; G06F 9/4843; G06F 9/4862; G06F 9/4868
  See application file for complete search history.

(56) References Cited

U.S. PATENT DOCUMENTS

| | | | |
|---|---|---|---|
| 6,754,647 | B1 | 6/2004 | Tackett et al. |
| 7,039,654 | B1 | 5/2006 | Eder |
| 7,861,252 | B2 | 12/2010 | Uszok et al. |
| 2004/0205772 | A1* | 10/2004 | Uszok ................ H04L 29/06 719/317 |
| 2007/0168480 | A1* | 7/2007 | Biggs ................ H04L 51/04 709/223 |

(Continued)

FOREIGN PATENT DOCUMENTS

EP  0862113 A2  9/1998

*Primary Examiner* — James J Lee
(74) *Attorney, Agent, or Firm* — Pepper Hamilton LLP

(57) ABSTRACT

Disclosed herein is a method and system for dynamically integrating a plurality of BOTs. The method comprises creating the plurality of BOTs offering one or more automated services, wherein each of the plurality of BOTs has a common BOT structure comprising one or more field parameters. One or more predefined functions are assigned to each of the plurality of BOTs, wherein at least one of the one or more predefined functions comprises a function value. A maturity score for each of the plurality of BOTs is determined based on the one or more field parameters and the function value upon assigning the one or more predefined functions to each of the plurality of BOTs. Finally, the plurality of BOTs are integrated by synchronizing data amongst the plurality of BOTs based on the maturity score.

17 Claims, 5 Drawing Sheets

(56) References Cited

U.S. PATENT DOCUMENTS

| | | | |
|---|---|---|---|
| 2012/0166757 A1* | 6/2012 | Volvovski | G06F 17/30 |
| | | | 711/206 |
| 2014/0278951 A1* | 9/2014 | O'Connor | G06Q 30/0251 |
| | | | 705/14.49 |
| 2016/0219631 A1* | 7/2016 | Chen | H04W 76/10 |
| 2016/0260037 A1* | 9/2016 | Kumar | G06Q 10/0637 |
| 2017/0206069 A1* | 7/2017 | Erwin | G06F 8/71 |

* cited by examiner

METHOD AND SYSTEM FOR DYNAMICALLY INTEGRATING BOTS

This application claims the benefit of Indian Patent Application Serial No. 201641009412 filed Mar. 17, 2016, which is hereby incorporated by reference in its entirety.

TECHNICAL FIELD

The present subject matter is related, in general to process automation, and more particularly, but not exclusively to a method and system for dynamically integrating BOTs.

BACKGROUND

Automation or Automatic control is the use of various control systems for execution of required tasks with minimal or reduced human intervention. Automated control systems may range from simple sensing devices to robots and other sophisticated equipment. Automation of operations may encompass the automation of a single operation to the automation of an entire factory. The advantages of automation include reduced time for execution of the tasks, increased operational flexibility, reduced human labor costs, elimination of human errors, or make up for the labor shortage.

Automation in Computer technology has been recently evolving. Automated services are being applied to automate tasks and procedures in an organization. The technology is aimed not at improving the efficiency of current office procedures, but at altering the nature of work altogether. Consider an example of an enterprise which has an infrastructure management team for providing solutions for the requests raised by employees of the enterprise. Requests are logged (input) and classified into specific functional groups. The classified requests are assigned to a member of concerned functional group for resolving the requests. The assigned member of the functional group interacts with the requester to get the missing information (if any). Based on the understanding of the information, the assigned team member solves the problem or suggests a solution to the requester to resolve the request. However, the whole process of classification, assignment and interaction and resolution of the requests is time consuming as they are held manually and are prone to potential human errors that may ultimately affect efficiency of the whole process.

One way of solving the above mentioned issues is by automating individual tasks at multiple stages of the process by use of automated software services or BOTs. BOT is a software application that runs on other software applications. Typically, bots perform tasks that are both simple and structurally repetitive, at a much higher rate than humans. For example, an Internet bot, also known as web robot, WWW robot or simply a bot, is a software application that runs automated tasks (scripts) over the Internet. BOTs may be designed for understanding the order and flow of activities at each stage of the process, generating its own rules automatically and for validating and self-learning the entire workflows. Typically, the BOTs, in their basic forms, are designed to work independently of the other BOTs.

SUMMARY

Disclosed herein is a method and system for dynamically integrating a plurality of bots. The method proposes a common structure for creating the plurality of BOTs. The common structure of the plurality of BOTs helps in coordinating the plurality of BOTs, thereby integrating each of the plurality of BOTs for performing a dynamic automated process.

Accordingly, the present disclosure relates to a method for dynamically integrating a plurality of BOTs. The method comprises creating, by a process automation system, the plurality of BOTs offering one or more automated services, wherein each of the plurality of BOTs has a common BOT structure comprising one or more field parameters. One or more predefined functions are assigned to each of the plurality of BOTs, wherein at least one of the one or more predefined functions comprises a function value. A maturity score for each of the plurality of BOTs is determined based on the one or more field parameters and the function value upon assigning the one or more predefined functions to each of the plurality of BOTs. Finally, the plurality of BOTs is integrated by synchronizing data amongst the plurality of BOTs based on the maturity score.

Further, the present disclosure relates to a process automation system for dynamically integrating a plurality of BOTs. The process automation system comprises a processor and a memory communicatively coupled to the processor. The memory stores processor-executable instructions, which, on execution, causes the processor to create the plurality of BOTs offering one or more automated services, wherein each of the plurality of BOTs has a common BOT structure comprising one or more field parameters. The instructions cause the processor to assign one or more predefined functions to each of the plurality of BOTs, wherein at least one of the one or more predefined functions comprises a function value. Further the instructions cause the processor to determine a maturity score for each of the plurality of BOTs based on the one or more field parameters and the function value. Finally, the instructions cause the processor to integrate the plurality of BOTs by synchronizing data amongst the plurality of BOTs based on the maturity score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
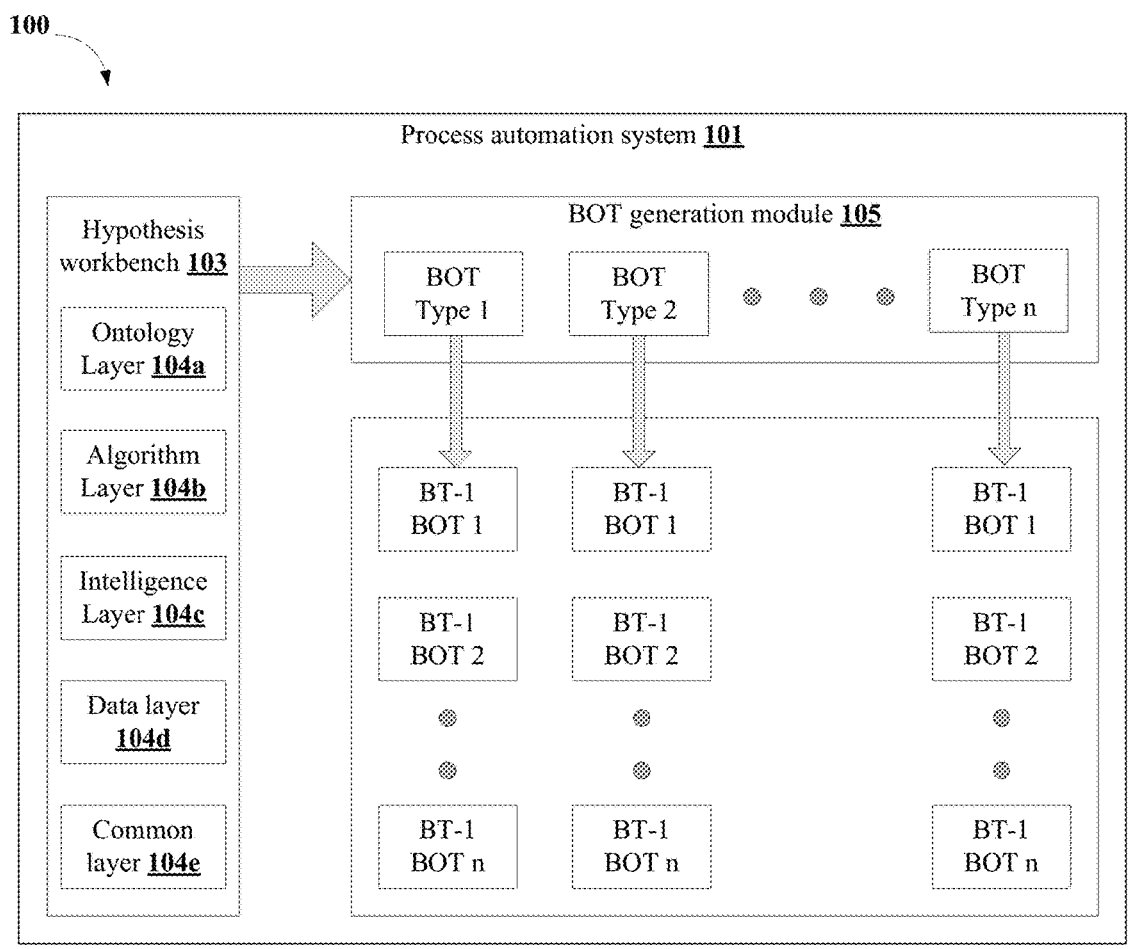
FIG. 1a shows an exemplary environment illustrating a method for creating a plurality of BOTs in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for dynamically integrating a plurality of BOTs. The method comprises creating, by a process automation system, the plurality of BOTs offering one or more automated services, wherein each of the plurality of BOTs has a common BOT structure comprising one or more field parameters. One or more predefined functions are assigned to each of the plurality of BOTs, wherein at least one of the one or more predefined functions comprises a function value. A maturity score for each of the plurality of BOTs is determined based on the one or more field parameters and the function value upon assigning the one or more predefined functions to each of the plurality of BOTs. Finally, the plurality of BOTs are integrated by synchronizing data amongst the plurality of BOTs based on the maturity score.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows an exemplary environment illustrating a method for creating a plurality of BOTs in accordance with some embodiments of the present disclosure.

The environment 100 comprises a process automation system 101 for dynamically creating plurality of BOTs. The process automation system 101 comprises a hypothesis workbench 103 and a BOT generation module 105. BOTs are automated processes or services or software components which are capable of performing a predefined function and are designed to work independently. The BOTs automate the processes by one or more methods including, understanding the activities, order and flow of the processes, generating their own rules automatically and validating the learning of the rules.

In an embodiment, the plurality of BOTs may be created using one or more rules and properties stored in a hypothesis workbench 103. The hypothesis workbench 103 is a collection of properties and specifications that describe a BOT process/service to be created. The rules and properties in the hypothesis workbench 103 may be categorized into various layers such as, Ontology layer 104a, Algorithm layer 104b, Intelligence layer 104c, Data layer 104d and common layer 104e.

In an embodiment, the BOT generation module 105 of the process automation system 101 may be used for creating/generating the plurality of BOTs based on the rules and properties of the BOTs defined in the hypothesis workbench 103. The BOT generation module 105 maintains a common structure for each of the plurality of BOTs, so that each of the created BOTs complements and coordinates with each other, resulting in an easy integration of the plurality of BOTs. In an embodiment, the BOT generation module 105 creates the plurality of BOTs belonging to multiple BOT Types. There may be several BOT Types, each of which individually performs a specific predefined function of the required service.

As shown in FIG. 1a, the BOT generation module 105 may create plurality of BOTs belonging to multiple BOT Types (BOT Type 1, BOT Type 2 to BOT Type n). Further, a plurality of BOTs may be created with respect to each of the multiple BOT Types. For example, BT-1 BOT1, BT-2 BOT2 to BT-1 BOT n are the BOTs that belong to the BOTs of type BOT Type 1. As an example, a BOT belonging to a "Classifier BOT Type" may be used for classifying a set of customer raised tickets into different categories, such as Service and/or Maintenance. Similarly, a BOT belonging to a "Resolver BOT Type" may be used for resolving the one more customer raised tickets, which are already been classified by the Classifier BOT.

Figure 1B:
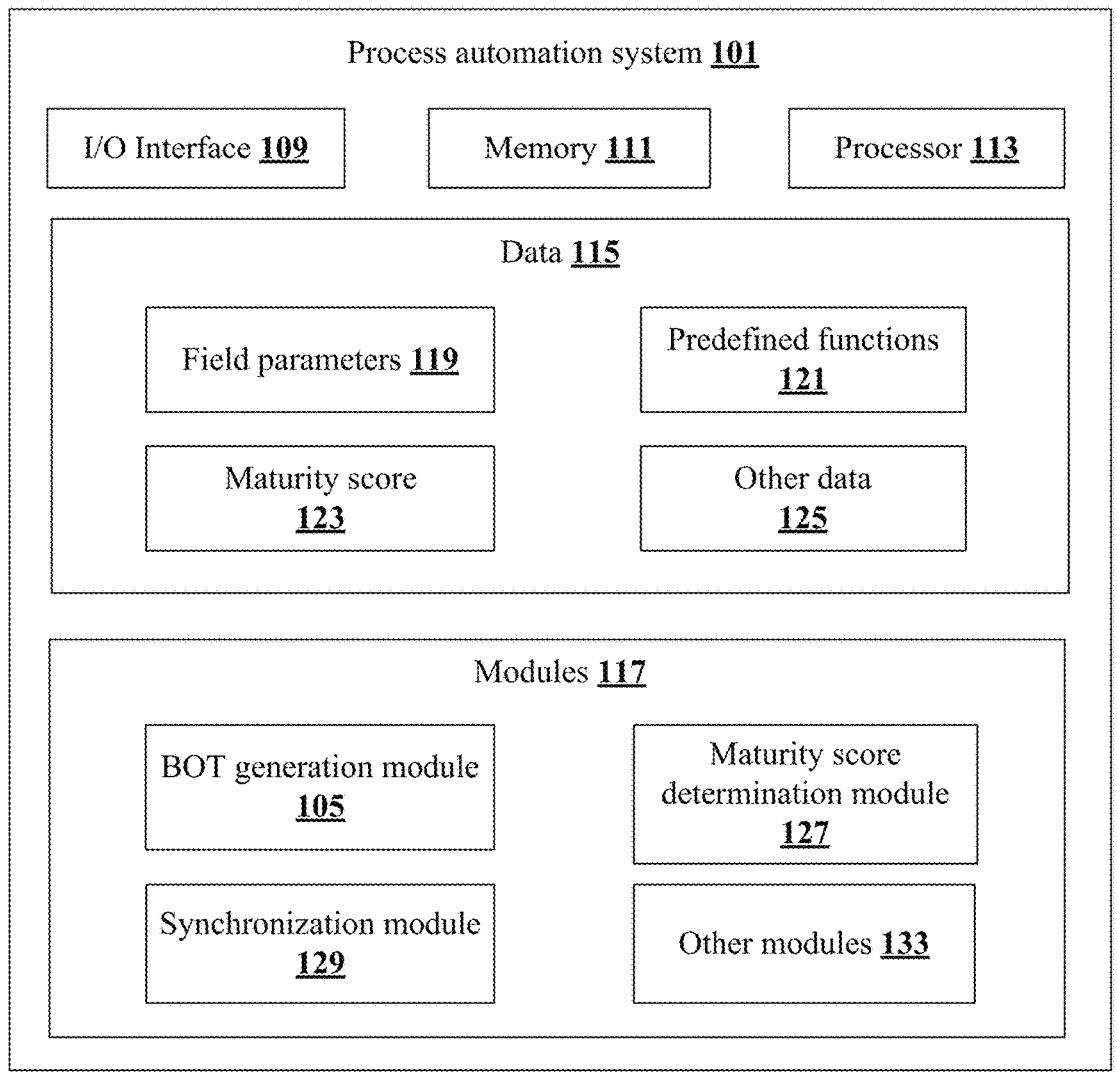
FIG. 1b shows a detailed block diagram illustrating a process automation system in accordance with some embodiments of the present disclosure.

FIG. 1b shows a detailed block diagram illustrating a process automation system in accordance with some embodiments of the present disclosure.

The process automation system 101 comprises an I/O Interface 109, a memory 111 and a processor 113. The memory 111 is communicatively coupled to the processor 113. The processor 113 is configured to perform one or more functions of the process automation system 101 for creating and dynamically integrating the plurality of BOTs. In one implementation, the process automation system 101 comprises data 115 and modules 117 for performing various operations in accordance with the embodiments of the present disclosure. In an embodiment, the data 115 may include, without limiting to, one or more field parameters 119, one or more predefined functions 121, maturity score 123 and other data 125.

In one embodiment, the data 115 may be stored in the memory 111 in the form of various data structures. Additionally, the aforementioned data 115 can be organized using data models, such as relational or hierarchical data models. The other data 125 may store data 115, including temporary data and temporary files, generated by modules 117 for performing the various functions of the process automation system 101.

In an embodiment, each of the plurality of BOTs has a common BOT structure comprising one or more field parameters 119. The one or more field parameters 119 may comprises, without limitation, a BOT identification (ID) number, BOT name, BOT type, BOT type version, BOT version, group name of the BOT, BOT state, source file format, source file name, source file path, data version, algorithm used for processing data, BOT status, frequency of requests to the BOT, time period of the requests, reward points and penalty points, last synchronization date, last synchronization status, BOT maturity, publish topics of the BOT, subscription topics of the BOT, last published event message, last received event message, association properties, work flow properties, source BOT ID, target BOT ID and deploy instance count of the BOT. The functions and data values assigned to each of the one or more field parameters 119 are explained in detail in the below section.

BOT ID:

In an embodiment, the BOT ID is a unique identifier for each of the plurality of BOTs. As an example, the BOT ID assigned to each of the plurality of BOTs can be a numerical data, such as natural numbers, which uniquely identifies each of the plurality of BOTs.

BOT Name:

In an embodiment, the BOT name is a name given to each of the plurality of BOTs. The BOT name may also be called as service name of the BOTs. As an example, the BOT names assigned to each of the plurality of BOTs can be "ABC_BOT", "TestBOT" etc.

BOT Type:

In an embodiment, the BOT type field parameter of each of the plurality of BOTs indicates the type of BOT from which the plurality of BOTs are created. The BOT Type field parameter may help in understanding the specific functionalities achieved by each of the plurality of BOTs based on their type. Some exemplary BOT types may include Investigation BOTs, Classifier BOTs, Resolver BOTs, Outlier BOTs, Concept extraction BOTs, Summarization BOTs, Do it yourself BOTs, Task assignment BOTs, Research BOTs, Service Ticket BOTs and Diagnosis BOTs.

BOT Type Version:

In an embodiment, the BOT Type Version field parameter of each of the plurality of BOTs indicates the version of the BOT type from which each of the plurality of BOTs are created. Each type of the BOT has a BOT Type Version of its own. In an embodiment, previous BOT Type Versions of a BOT are maintained till the expiry date of the BOT type. The newer BOT Type Versions may be assigned to each of the plurality of BOTS whenever there is an update in the algorithm or logic used for creating each of the plurality of BOTs. As an example, the classifier BOT Type may have multiple version numbers 1.0, 2.0 and 3.0 based on the version of its modification and may be represented as "BOT_Name1—Classifier BOT Type—Ver2.0".

BOT Version:

In an embodiment, the BOT Version field parameter indicates the version of each of the plurality of BOTs. As an example, the BOT Version of the classifier BOT Type may be represented as "BOT_Name1—Classifier BOT Type—Ver2.0-BOTVer1".

BOT Group Name:

In an embodiment, each of the plurality of BOTs is identified by a common name called the Group Name when the plurality of BOTs are created. The Group Name of the plurality of BOTs uniquely identifies the one or more BOTs performing similar functionalities. Each of the one or more BOTs identified by a single Group Name may work together to complete a single function. As an example, consider an instance of creating 5 classifier BOTs for a specific event XYZ. Here, all 5 BOTs may have a common group name, such as, "XYZ_Classifiers". Further, each of the 5 classifier BOTs may have different names, such as, XYZ_Classfier1, XYZ_Classfier2, XYZ_Classfier3, XYZ_Classfier4 and XYZ_Classfier5.

BOT State:

In an embodiment, each of the plurality of BOTs may be represented in two distinct states, Active and Inactive. The plurality of BOTs may be in Active state when the plurality of BOTs is ready to be used. Similarly, the plurality of BOTs may be in Inactive stare when the plurality of BOTs is not in an operational state.

Source File Format:

The Source file format filed parameter of each of the plurality of BOTs indicates the format of source data/source file. In an embodiment, the Source file format field parameter of a BOT is applicable only if a source file is required for creating the BOT. As an example, the Source file format of the BOT may include, without limitation, ".csv", ".xls", ".txt" and ".ini".

Source File Name:

In an embodiment, the Source file name of a BOT is the file name of the source file used while creating the plurality of BOTs. The Source file name may be used for building and managing the plurality of BOTs.

Source File Path:

In an embodiment, the Source file path field parameter of each of the plurality of BOTs is the absolute path of the source file used while creating each of the plurality of BOTs.

Data Version:

In an embodiment, the Data Version field parameter of each of the plurality of BOTs indicates the version of data used for training the BOT.

Algorithm:

In an embodiment, the Algorithm field parameter of each of the plurality of the BOTs indicates the internal algorithm that may be used for processing the data used for training the BOT. In an embodiment, each of the plurality of BOTs may work on one of the multiple internal algorithms. These algorithms may be implemented at BOT Type level and any of the algorithms specified in this level may be used for processing the input.

BOT Status:

The BOT status of each of the plurality of BOTs indicates the operational status of each of the plurality of BOTs. In an embodiment, the BOT status of the BOT may be used to trigger the event message communication process between the plurality of BOTs (illustrated in FIG. 2). The BOT status may include, without limitation, the following BOT status parameters.

BOT_REGISTERED

The "BOT_REGISTERED" status indicates that a BOT is registered with the BOT generation module. The further process of creating and building the BOT may be initiated after this status is set.

MODEL_BUILD_PROGRESS

The "MODEL_BUILD_PROGRESS" status is set when a model is being built for each of the plurality of the BOTs. Model building happens with the source data file and logic of modeling. Upon building the model, the model upload process is initiated.

MODEL_UPLOADING

The "MODEL_UPLOADING" status is set after the model building process is completed. In an embodiment, the model file has to be uploaded completely before initializing the BOT deployment process.

READY_TO_DEPLOY

The "READY_TO_DEPLOY" status of the BOT indicates that the BOT model is uploaded completely and the BOT is ready to deploy. In an embodiment, the deployment of BOTs may require an external trigger, such as, a deployment initiation request to start the BOT deployment process.

DEPLOY_IN_PROGRESS

The "DEPLOY_IN_PROGRESS" status indicates that the model deployment process of the BOT is in progress. In this state, the BOT model is checked for deployment, and is loaded into deployment once the BOT is ready.

BOT_DEPLOYED

The "BOT_DEPLOYED" is the state in which the BOT is deployed completely. In an embodiment, none of the BOT services may have been started in the "BOT_DEPLOYED" status and an error message may be thrown if the BOT service is invoked while the BOT is in this state. Also, the BOT may change its status to "BOT_DEPLOYED" status when the operational BOT changes the state from Active to Inactive.

READY_TO_USE

The "READY_TO_USE" status of the BOT is set when the BOT is completely loaded into the memory and is ready for service. In an embodiment, the "READY_TO_USE" status may also be set when the BOT moves from the Inactive state to the Active state.

BOT_TRANSACTIONS

The "BOT_TRANSACTIONS" status of the BOT is set when the BOT is ready for service and is ready for performing the transactions.

Frequency of Requests to the BOT:

The Frequency of requests to the BOT is the number of requests handled by the BOT. In an embodiment, the frequency of requests to the BOT may be used to calculate the rank order of the BOT. The Frequency field parameter may be reset when the synchronization of learned data happens between the plurality of the BOTs.

Time Period of the Requests:

The Time period of the requests handled by a BOT is the sum of time period of each of the requests handled by the BOT. In an embodiment, the Time period field parameter may be reset when the synchronization of the learned data happens between the plurality of the BOTs.

Reward Points and Penalty Points:

The Points (Reward points and Penalty points) are numerical values assigned to each of the plurality of BOTs when the plurality of BOTs handle a request. In an embodiment, the points may be used to calculate the Rank order of the plurality of the BOTs. Also, the Points field parameter may be reset when the synchronization of learned data happens between the plurality of BOTs.

In an embodiment, the plurality of BOTs may be awarded with a Reward point when the plurality of BOTs successfully respond to a request. Similarly, the plurality of BOTs may be awarded with a Penalty point when the plurality of BOTs fail to respond to a request.

In an embodiment, the synchronization between the plurality of BOTs may happen when the values of at least one of the three field parameters 119, the Frequency of requests to the BOT, the Time period of the requests and the Reward points and Penalty points is higher than a predefined value of the Frequency of requests to the BOT, the Time period of the requests and the Reward points and Penalty points respectively.

Last Synchronization Date:

In an embodiment, the Last Synchronization Date field parameter indicates the date when the last synchronization of learned data between the plurality of the BOTs has taken place.

Last Synchronization Status:

The Last Synchronization Status of the plurality of BOTs indicates the status of the synchronization process of learned data. In an embodiment, the Last Synchronization Status of the plurality of BOTs may be one of Successful and Unsuccessful.

BOT Maturity:

In an embodiment, the BOT Maturity field parameter indicates the performance of the BOT in terms of its learning with respect to the learning data used for training the BOT.

Publish Topics of the BOT:

The Publish topics field parameter indicates the topics for which the BOT has been registered as a Publisher. In an embodiment, a BOT may publish one or more Publish topics only if the BOT is registered as a Publisher for the one or more Publish topics in "Event Message service" of the plurality of BOTs. The "Event Message service" comprises different categories of messages, called as the Publish topics. A Publisher BOT may publish its messages to only those Publish topics in the "Event Message service" for which the BOT is registered as a Publisher.

Subscription Topics of the BOT:

This field parameter indicates the topics for which the BOT has been registered as a Subscriber. In an embodiment, a BOT may subscribe to one or more Subscription topics only if the BOT is registered as a Subscriber for the one or more Subscription topics in the "Event Message service" of the plurality of BOTs. The "Event Message service" comprises different categories of messages, called as the Subscription topics. A Subscriber BOT may subscribe to only those Subscription topics in the "Event Message service" for which the BOT is registered as a Subscriber.

Last Published Event Message:

This field parameter indicates the last event message published by a Publisher BOT. In an embodiment, the Last published event message field parameter may be useful in identifying the last message published by the Publisher BOT, since the Publisher BOT may keep publishing plurality of messages when it is in the Active state.

Last Received Event Message

This field parameter indicates the last event message received by a Subscriber BOT. In an embodiment, the Last received event message field parameter may be useful in identifying the last message received by the Subscriber BOT, since the Subscriber BOT may subscribe to a plurality of messages when it is in the Active state.

Association Property:

The Association property field parameter of a BOT indicates the association of the BOT with plurality of other BOTs. In an embodiment, the association property of the plurality of BOTs may be determined based on the existence of the plurality of BOTs in a BOT Work flow. The BOT Work flow may be formed when the plurality of BOTs are assembled to provide a common BOT service.

In an embodiment, the values assigned to the Association property field parameter may include, without limitation, "Optional", "Mandatory", "Repeatable", "Conditional", "Order based", etc. As an example, a Classifier BOT may be "Mandatory" for a Resolver BOT to perform. Similarly, the Classifier BOTs may be "Repeatable" when used in a particular order/position of the BOT Work flow.

Work Flow Property:

The Work flow property field parameter of a BOT indicates a reference to the relationship of the BOT with one of the target BOT in the BOT Work flow during the association of the BOT with the target BOT. In an embodiment, the relationship between a current BOT and the target BOT may be of five different types as listed below.

Dependency

Here, the target BOT may be dependent on the current BOT and the target BOT may stop working when the current BOT stops working.

Generalization

Here, the target BOT requires an input data from the current BOT to complete its servicing. The current BOT may transmit the required input data to the target block upon receiving a request from the target BOT.

Association

Here, the current BOT and the target BOT may involve in a "many-to-many" BOT relationship. i.e., the current BOT may relate to plurality of target BOTs and vice-versa.

Aggregation

Here, the target BOT is one for the given current BOT and the plurality of BOTs have same BOT as the target BOT.

Composition

Here, the target BOT is one for the given current BOT and plurality of BOTs have the same BOT as the target BOT. In an embodiment, during composition, the target BOT may exist only if the current BOT stops communicating.

Source BOT ID:

The Source BOT ID field parameter of the plurality of BOTs indicates the BOT ID of a Source BOT from which the current BOT receives the data for service. In an embodiment, the Source BOT may be the BOT after which the current BOT starts its service. As an example, a Classifier BOT may become the Source BOT for a Resolver BOT, since the Resolver BOT starts its service only after the Classifier BOT has completed its service.

Target BOT ID:

The Target BOT ID field parameter of the plurality of BOTs indicates the BOT ID of a Target BOT to which the current BOT transmits the data for service. In an embodiment, the Target BOT may be the BOT before which the current BOT starts its service. As an example, a Resolver BOT may become the Target BOT for a Classifier BOT, since the Resolver BOT begins its service only after the Classifier BOT has completed its service.

Deploy Instance Count:

The Deploy instance count field parameter of the plurality of BOTs indicates the number of times/instances in which the current BOT has been created and deployed. In an embodiment, a single BOT may be deployed at multiple instances and all the BOTs created in each of those multiple instances form a common BOT group.

In an embodiment, in addition to one or more common BOT functionalities, each of the plurality of BOTs may be further assigned with the one or more predefined functions 121 for enabling each of the plurality of BOTs to perform one or more required services. The one or more predefined functions 121 assigned to each of the plurality of BOTs may include, without limitation, starting the BOT, stopping the BOT, assembling the BOT, deploying the BOT, detecting the maturity score 123 of the BOT, assigning the maturity score 123 of the BOT, detecting a rank order of the BOT, assigning reward and penalty points to the BOT, verifying the BOT, checking status of the BOT and assigning the threshold values of frequency, time and total number of the reward points and the penalty points. The one or more predefined functions 121 assigned to each of the plurality of BOTs is briefly explained in the below paragraphs.

Starting the BOT:

The Start function of a BOT is the BOT's internal function to start its services. During execution of the start function, the state of the BOT may be changed to Active to indicate that the BOT is operational. The plurality of BOTs may respond/handle one or more requests when the start function is executed. In an embodiment, the start function may be invoked on a BOT whose status is "BOT_DEPLOYED", which means that the BOT has been deployed and is ready for servicing. Further, after executing the Start function, the BOT is set with the "READY_TO_USE" status.

Stopping the BOT:

The Stop function of the BOT is an internal function of the BOT that stops all necessary services of the BOT and sets the state of the BOT as Inactive. In an embodiment, the BOT may not be accessible after executing the Stop function. The BOT Stop function may be used for a BOT whose status is "BOT_TRANSACTIONS" or "READY_TO_USE". Upon executing the Stop method, the BOT may be set to "BOT_DEPLOYED" status.

Assembling (Build) the BOT:

The Build function may be used when the BOT is in "BOT_DEPLOYED" or "BOT_REGISTERED" status. In an embodiment, the Build function may be used when the user wants to train the BOT with different set of Learning Data. Alternatively, the Build function may also be used for building and uploading the model of the BOT, so that the BOT is ready for deployment. After execution of the Build function, the BOT may be set with the "READY_TO_DEPLOY" status.

Deploying the BOT:

The Deploy function of the BOT may be used to deploy an uploaded instance of the BOT model. The BOT may be set to the "BOT_DEPLOYED" status upon completion of the Deploy function.

Detecting the Maturity Score of the BOT (Get Maturity):

The Get Maturity function of the BOT may be used to determine the Maturity score of the BOT with respect to the trained data. The Maturity score may help to determine the performance of the BOT in terms of the learning with respect to the Learning Data used for training.

Assigning the Maturity Score of the BOT (Set Maturity):

The Set Maturity function of the BOT may be used to set the Maturity score of the BOT with respect to the trained data. In an embodiment, the Maturity score may be used to determine a right set of data among multiple sets of Learning Data used for training the BOT.

Detecting the Rank Order of the BOT (Get Rank Order):

The Get Rank order function may be used to determine the Rank order of one of the plurality of BOTs with respect to other of the plurality of BOTs having the same BOT Type.

The Rank order of the BOT may be used to determine the performance of the BOT when compared to other BOTs of same BOT Type.

Assigning Rank Order of the BOT (Set Rank Order):

The Set Rank order function may be used to assign the Rank order of one of the plurality of BOTs with respect to other of the plurality of BOTs having same BOT Type. In an embodiment, the Rank order of the plurality of BOTs may be assigned based on the accuracy of performance of the plurality of BOTs.

Assigning the Predefined Values (Set Threshold):

The Set threshold function may be used to set the predefined values of Frequency, Time period and total number of the Reward points and the Penalty points assigned to each of the plurality of BOTs for synchronizing the plurality of BOTs. In an embodiment, the predefined values may be stored in a separate configuration file and may be distinct for each of the plurality of BOTs. Further, the synchronization between the plurality of BOTs may happen when the values of at least one of the three field parameters 119, the Frequency, the Time period and the total number of Reward points and Penalty points is higher than their respective predefined values.

Verifying the BOT:

This function may be used to verify/test each of the plurality of BOTs. The Verify function takes certain input text data, processes it and then outputs the results. The results may be used to verify/test the BOT.

Checking the State of the BOT (State Check):

The State check function may be used to determine the operational state of each of the plurality of BOTs. In an embodiment, the operational state of each of the plurality of BOTs may be one of Active and Inactive.

Checking the Status of the BOT (Status Check)

The Status check function, also called as "Health check" function, may be used to determine the status of each of the plurality of BOTs. In an embodiment, the status of the plurality of BOTs may be one of BOT_REGISTERED, MODEL_BUILD_PROGRESS, MODEL_UPLOADING, READY_TO_DEPLOY, DEPLOY_IN_PROGRESS, BOT_DEPLOYED, READY_TO_USE and BOT_TRANSACTIONS as explained in the earlier section.

In an embodiment, the maturity score 123 associated with each of the plurality of BOTs is a measure of the performance of each of the plurality of BOTs in terms of learning with respect to the Learning Data used for training each of the plurality of BOTs. Also, the maturity score 123 associated with each of the plurality of BOTs may be used for selecting a right set of Learning Data that has to be used for training each of the plurality of BOTs. In an embodiment, the maturity score 123 for each of the plurality of BOTs is determined when the number of requests handled by each of the plurality of BOTs is higher than a predefined number of requests. The maturity score 123 of each of the plurality of BOTs is mainly used for synching the learnt data between the plurality of BOTs and to find the progress of the learning of different BOTs having a same BOT Type.

In one implementation, the one or more modules 117 may include, without limitation, a BOT generation module 105, a maturity score determination module 127, a synchronization module 129, and other modules 133. The other modules 133 may be used to perform various miscellaneous functionalities of the process automation system 101. It will be appreciated that such aforementioned modules 117 may be represented as a single module or a combination of different modules 117. In an embodiment, the one or more modules 117 may also be present within the processor 113 of the process automation system 101. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the BOT generation module 105 may be used to create/generate each of the plurality of BOTs. In an embodiment, each of the plurality of BOTs, created by the BOT generation module 105 may belong to multiple BOT Types. i.e., plurality of BOTs may be created from a single BOT Type. Further, each of the plurality of BOTs, upon creation, is assigned with a unique BOT name and BOT ID. The BOT name and BOT ID of the BOT may be used for retrieving the other metadata, such as, values of multiple field parameters 119 of the BOT at a later instance. Furthermore, the BOT generation module 105 may also assign one or more values to the one or more field parameters 119 of each of the plurality of BOTs created.

In an embodiment, the maturity score determination module 127 may be used for determining the maturity score 123 associated with each of the plurality of BOTs. The "Set Maturity" and the "Get Maturity" functions of each of the plurality of BOTs are used for determining the maturity score 123 of the plurality of BOTs. In an embodiment, the maturity score determination module 127 determines the maturity score 123 based on the number of requests handled by each of the plurality of BOTs, the number of reward points and the number of penalty points assigned to each of the plurality of BOTs.

In an embodiment, the maturity score 123 for each of the plurality of BOTs may be calculated using the below equation (1):

$$\text{Maturity Score} = \frac{\sum (R1 + R2 \ldots Rn) - \sum (P1 + P2 \ldots Pn)}{\sum (R1 \text{ to } Rn) + \sum (P1 \text{ to } Pn)} \quad (1)$$

Wherein, "R" indicates the Reward points and "P" indicates the Penalty points assigned to each of the plurality of BOTs.

As an example, consider "N" BOTs having a common BOT Type "Ti" which are created for performing a required service "S". Now, a user who has initiated each of the "N" BOTs, for performing the service "S", may assign multiple Points (Reward/Penalty) to each of the "N" BOTs based on the performance of each of the "N" BOTs while performing the service "S". Over a period of time and/or after having answered a predefined number of requests "R" of the service "S", the maturity score determination module 127 may generate the maturity score 123 of each of the "N" BOTs using the equation (1).

In an embodiment, the one or more requests from the user may be directed to one of the plurality of BOTs based on the maturity score 123 of the BOTs. As an example, one or more data classification requests may be diverted to one of the Classifier BOT which has highest maturity score 123 among the plurality of other Classifier BOTs.

In an embodiment, the synchronization module 129 may be used for synchronizing the data amongst the plurality of BOTs based on the maturity score 123 of each of the plurality of BOTs. The synchronization of data, also known as knowledge transfer, may happen at one or more scheduled time intervals. The time intervals for performing the knowledge transfer may be configured taking into considerations of "No-transaction time" of the plurality of BOTs. The "No-transaction time" is the time in which none of the plurality of BOTs is involved in any transaction.

In an embodiment, the synchronization module 129 may proceed with the knowledge transfer process only when the value of the Last Synch Date field parameter of the BOT has reached a threshold value, say, 7 days. During synchronization, a Source BOT, which has some data to be transferred to plurality of other BOTs (Destination BOTs), continues to be in the Active state and the plurality of Destination BOTs will remain in the Inactive state. Further, the state of the plurality of Destination BOTs will be set back to Active when the synchronization process is complete. Finally, the Last Synch Date of each of the Source BOT and the plurality of BOTs may be updated to the current time of synchronization.

In an embodiment, each of the plurality of BOTs is integrated when each of the plurality of BOTs is synchronized. A communication interface configured in the process automation system 101 helps in performing the knowledge share between the Source BOT and the plurality of Destination BOTs when they are synchronized with each other. In an embodiment, the communication among each of the plurality of BOTs may be established using the "Event Message Service" model or by using one or more communication Application Program Interfaces (APIs) associated with each of the plurality of BOTs.

In an embodiment, the communication using the Event Message Service model 203 is an event based process. Here, the communication may be triggered whenever there is a change in the status of each of the plurality of BOTs. In Event Message Service model 203, different categories of messages are created and these categories are called as Topics. The plurality of BOTs which are registered as "Publishers" for one of the Topics may send messages and the other BOTs which are registered as "Subscribers" will receive the message created/transmitted from the Publisher BOTs 201.

In an embodiment, each of the messages communicated using the Event Message Service model 203 may have a common message format as shown below:

```
{"Event_Topic": <Topic_Name>,
    "Data": {
        "BOT_ID": <BOT ID>,
        "BOT_Type": <BOT Type>,
        "BOT_Group": <BOT Group>,
        "Group_Name": <Group Name>,
        "BOT_Version": <Version Number>,
        "Date_Created": <BOT Creation Timestamp >,
        "Date_Updated": <BOT Update Timestamp >,
        "Date_Delete": <BOT Deletion Timestamp>,
        "Status": <BOT Status>,
        "State": <BOT State>
    }
}
```

Figure 2:
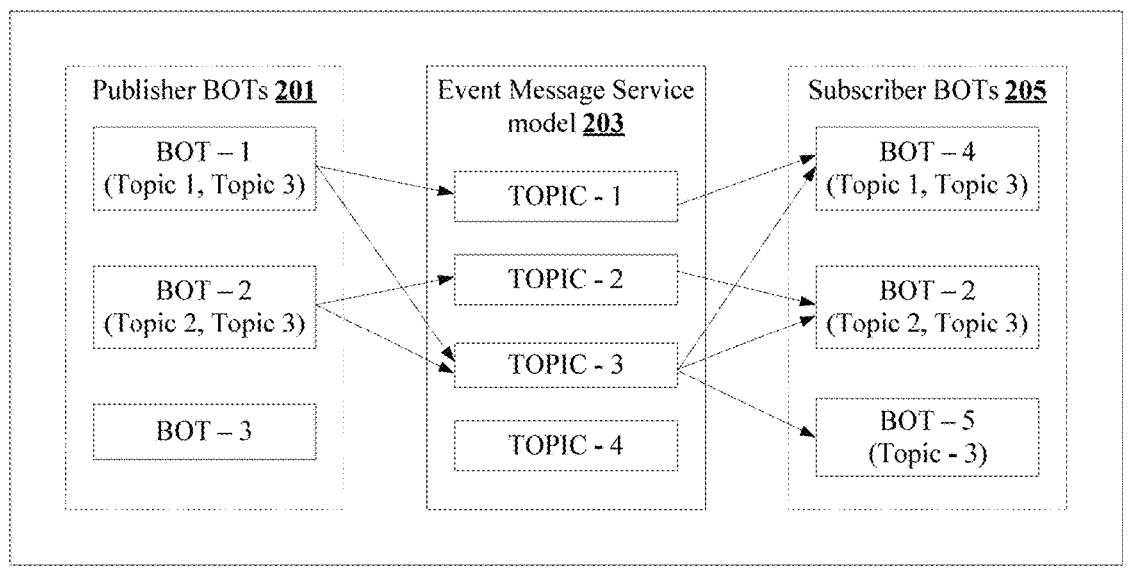
FIG. 2 shows a method of establishing event based communication between the plurality of BOTs in accordance with some embodiments of the present disclosure.

FIG. 2 illustrates the method of establishing event message communication between the plurality of BOTs in accordance with some embodiments of the present disclosure. As seen in the figure, there are three BOTs, namely BOT-1, BOT-2 and BOT-3, which are registered as Publishers in the Event Message Service model 203. Similarly, BOT-4, BOT-2 and BOT-5 are registered as the Subscribers for the Topics published by the Publisher BOTs 201. The Event Message Service model 203 has a list of available Topics (Topic-1 to Topic-4) which may be used by the Publisher BOTs 201 for establishing the communication with the Subscriber BOTs 205.

As an example, as shown in FIG. 2, BOT-1 may publish two topics, Topic-1 and Topic-3, which are in turn subscribed by the Subscriber BOT-4. Also, BOT-2 may be registered as both a Publisher and a Subscriber for the topics, Topic-2 and Topic-3, which means that the BOT-2 may publish as well as subscribe message of the topics, Topic-2 and Topic-3. Similarly, the BOT-3 may be registered as a Publisher BOT, but may not publish any Topics at a current time of activity.

Figure 3:
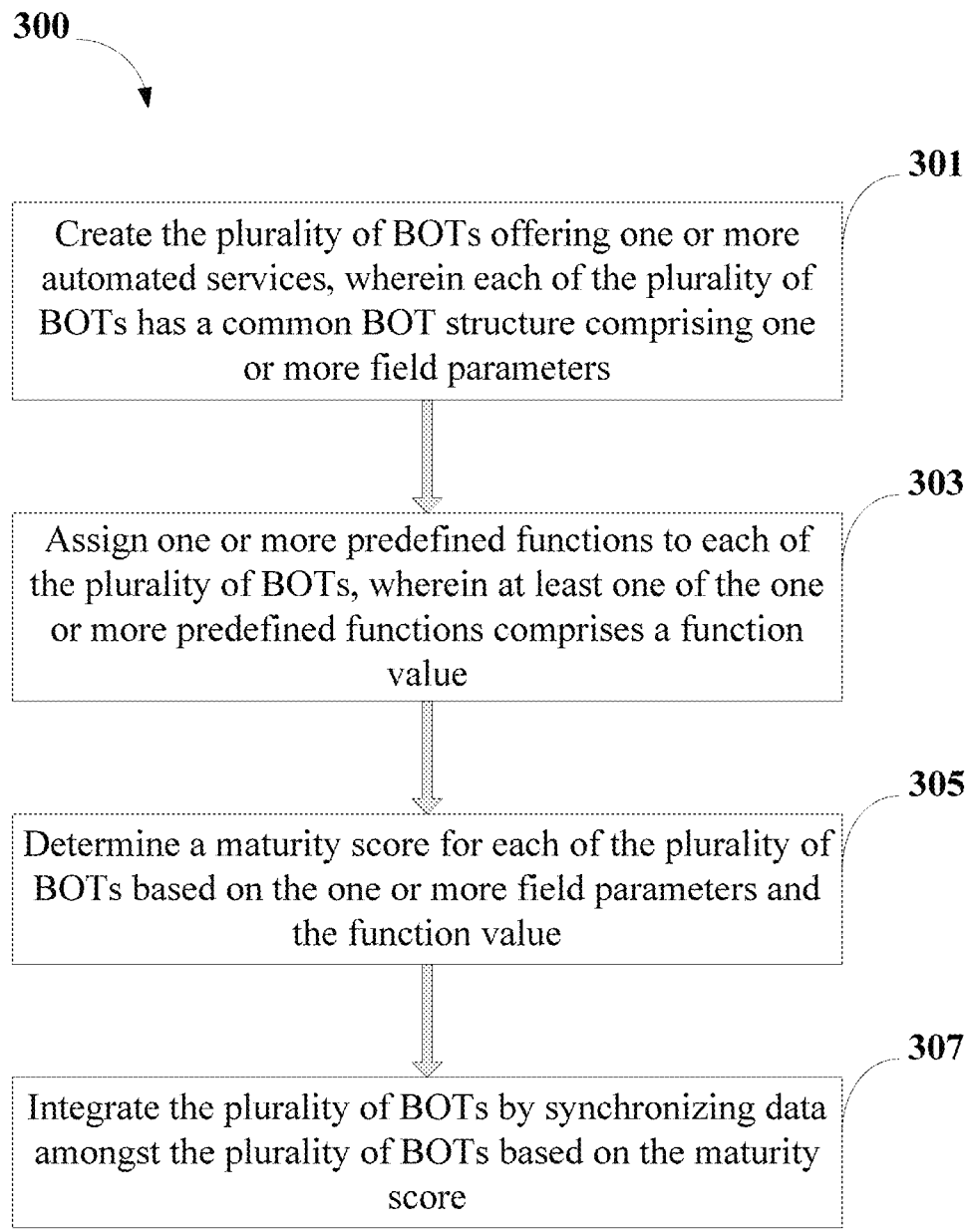
FIG. 3 illustrates a flowchart showing a method for dynamically integrating the plurality of BOTs in accordance with some embodiments of the present disclosure.

FIG. 3 illustrates a flowchart showing a method for dynamically integrating the plurality of BOTs in accordance with some embodiments of the present disclosure.

As illustrated in FIG. 3, the method 300 comprises one or more blocks for dynamically integrating a plurality of BOTs using a process automation system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, a process automation system 101 creates the plurality of BOTs offering one or more automated services, wherein each of the plurality of BOTs has a common BOT structure comprising one or more field parameters 119. The one or more field parameters 119 comprises at least one of a BOT identification (ID) number, BOT name, BOT type, BOT type version, BOT version, group name of the BOT, BOT state, source file format, source file name, source file path, data version, algorithm used for processing data, BOT status, frequency of requests to the BOT, time period of the requests, reward points and penalty points, last synchronization date, last synchronization status, BOT maturity, publish topics of the BOT, subscription topics of the BOT, last published event message, last received event message, association property, work flow property, source BOT ID, target BOT ID and deploy instance count of the BOT.

At block 303, the process automation system 101 assigns one or more predefined functions 121 to each of the plurality of BOTs, wherein at least one of the one or more predefined functions 121 comprises a function value. Further, at least one of the one or more predefined function values are updated upon handling of an event by one of a BOT from the plurality of BOTs. The one or more predefined functions 121 includes at least one of starting the BOT, stopping the BOT, assembling the BOT, deploying the BOT, detecting the maturity score 123 of the BOT, assigning the maturity score 123 of the BOT, detecting the rank order of the BOT, assigning the rank order of the BOT, verifying the BOT, checking status of the BOT and assigning the threshold values of frequency, time and total number of the reward points and the penalty points.

At block 305, the process automation system 101 determines a maturity score 123 for each of the plurality of BOTs based on the one or more field parameters 119 and the function value. The maturity score 123 for each of the plurality of BOTs is determined when the number of requests handled by each of the plurality of BOTs individually is higher than a predefined number of requests. Further, the maturity score 123 for each of the plurality of BOTs is determined based on the number of requests handled by each of the plurality of BOTs, the number of reward points and the number of penalty points assigned to each of the plurality of BOTs.

At block 307, the process automation system 101 integrates the plurality of BOTs by synchronizing data amongst the plurality of BOTs based on the maturity score 123. The plurality of BOTs are synchronized when at least one of the maturity score 123, the frequency of requests and the time period of the requests associated with one of the plurality of BOTs is higher than a predefined maturity score 123, predefined frequency of requests, predefined time period of the requests respectively. A communication is established between each of the plurality of BOTs using at least one of an event message service model 203 and one or more communication Application Program Interfaces (APIs) associated with each of the plurality of BOTs for synchronizing data amongst the plurality of BOTs. Further, the plurality of integrated BOTs are used to create one or more dynamic automated processes.

Computer System

Figure 4:
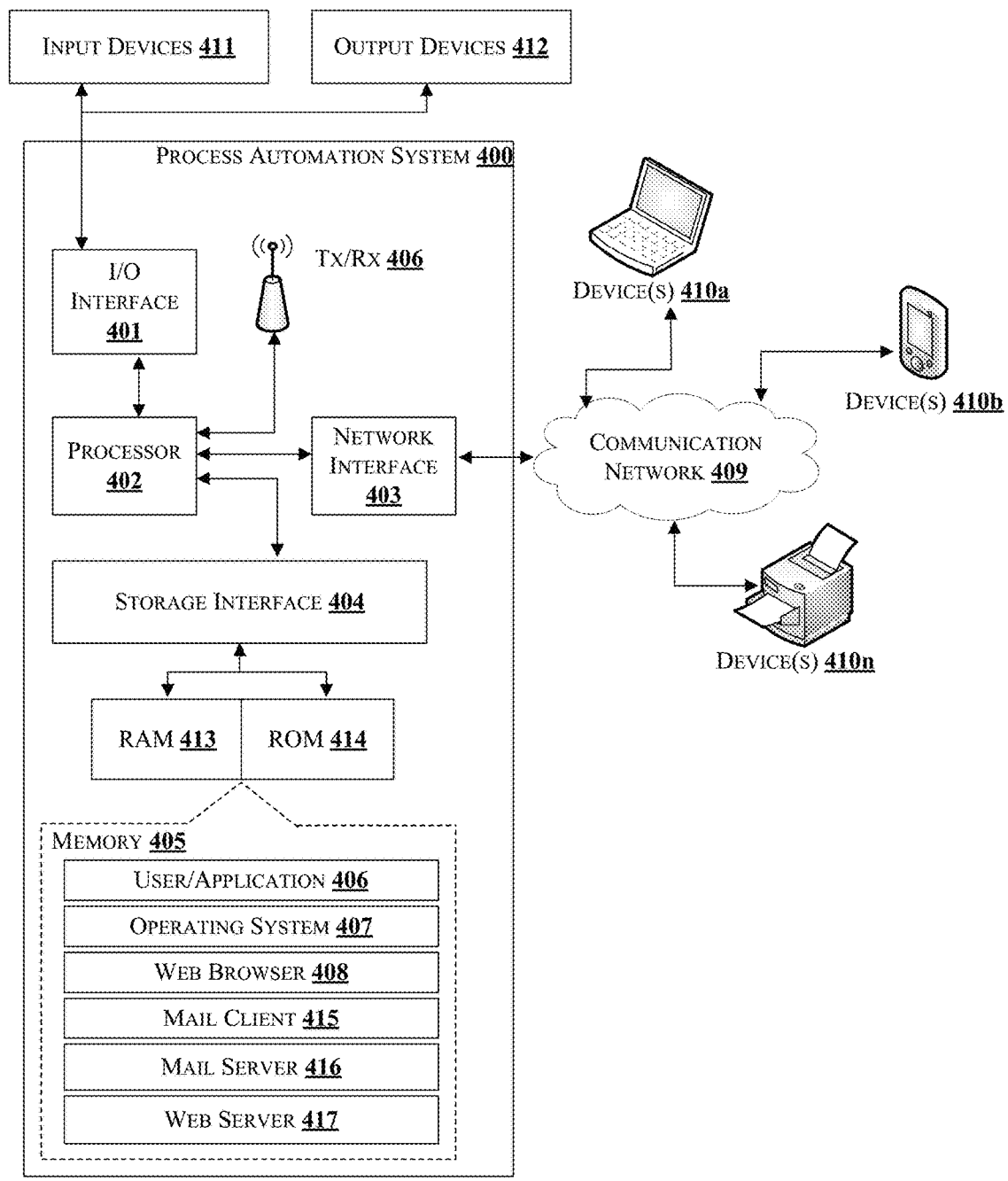
FIG. 4 illustrates a block diagram of an exemplary computer system for implementing embodiments consistent with the present disclosure.

FIG. 4 illustrates a block diagram of an exemplary computer system for implementing embodiments consistent with the present invention. In an embodiment, the process automation system 400 is used for dynamically integrating a plurality of BOTs. The process automation system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc.) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for creating dynamic automated processes by establishing mutual communication, collaboration, comprehension and complement between the plurality of BOTs.

In an embodiment, the present disclosure provides an easy method of creating, configuring and integrating plurality of BOTs by creating a common structure for each of the plurality of BOTs.

In an embodiment, the present disclosure provides a method for transferring learning/knowledge between the plurality of BOTs based on the maturity of the BOTs.

In an embodiment, the present disclosure ranks each of the plurality of BOTs based on maturity and learning of the plurality of BOTs, thereby allowing a user to decide on the selection of the plurality of the BOTs for various required scenarios.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Process automation system |
| 103 | Hypothesis workbench |
| 105 | BOT generation module |
| 109 | I/O Interface |
| 111 | Memory |
| 113 | Processor |
| 115 | Data |
| 117 | Modules |
| 119 | Field parameters |
| 121 | Predefined functions |
| 123 | Maturity score |
| 125 | Other data |
| 127 | Maturity score determination module |
| 129 | Synchronization module |
| 133 | Other modules |
| 201 | Publisher BOTs |
| 203 | Event Message Service model |
| 205 | Subscriber BOTs |

What is claimed is:

1. A method for dynamically integrating a plurality of BOTs, the method comprising:
    creating automatically, by a process automation system, the plurality of BOTs offering one or more automated services, wherein each of the plurality of BOTs has a common BOT structure comprising one or more field parameters, wherein the common BOT structure further comprises a frequency of requests to the plurality of BOTs, and wherein the common BOT structure is used to coordinate between the plurality of BOTs with at least one similar functionality for offering the one or more automated services;

assigning, by the process automation system, one or more predefined functions to each of the plurality of BOTs, wherein at least one of the one or more predefined functions comprises a function value;

determining, by the process automation system, a maturity score for each of the plurality of BOTs based on the one or more field parameters and the function value;

integrating, by the process automation system, the plurality of BOTs by synchronizing data amongst the plurality of BOTs based on the maturity score, wherein the plurality of BOTs are synchronized when at least one of the maturity score, frequency of requests and time period of the requests associated with one of the plurality of BOTs is higher than a predefined maturity score, predefined frequency of requests and predefined time period of the requests respectively;

resetting, by the process automation system, current function and data values of the frequency of requests to the plurality of BOTs after the synchronization; and dynamically updating, by the process automation system, new function and data values of the frequency of requests to the plurality of BOTs for subsequent requests handled by the plurality of BOTs after the synchronization.

2. The method as claimed in claim 1, wherein the one or more field parameters comprises at least one of a BOT identification (ID) number, BOT name, BOT type, BOT type version, BOT version, BOT group name, BOT state, source file format, source file name, source file path, data version, algorithm used for processing data, BOT status, time period of the requests, reward points and penalty points, last synchronization date, last synchronization status, BOT maturity, publish topics of the BOT, subscription topics of the BOT, last published event message, last received event message, association property, work flow property, source BOT ID, target BOT ID and deploy instance count of the BOT.

3. The method as claimed in claim 1, wherein assigning the one or more predefined functions to each of the plurality of BOTs further comprises updating at least one of the one or more predefined function values upon handling of an event by a BOT from the plurality of BOTs.

4. The method as claimed in claim 3, wherein the one or more predefined functions includes at least one of starting the BOT, stopping the BOT, assembling the BOT, deploying the BOT, detecting the maturity score of the BOT, assigning the maturity score of the BOT, detecting the rank order of the BOT, assigning the rank order of the BOT, verifying the BOT, checking state of the BOT, checking the status of the BOT and assigning the threshold values of frequency, time and total number of the reward points and the penalty points.

5. The method as claimed in claim 1, wherein the maturity score for each of the plurality of BOTs is determined when a number of requests handled by each of the plurality of BOTs individually is higher than a predefined number of requests.

6. The method as claimed in claim 5, wherein determining the maturity score for each of the plurality of BOTs is based on the number of requests handled by each of the plurality of BOTs, the number of reward points and the number of penalty points assigned to each of the plurality of BOTs.

7. The method as claimed in claim 1, wherein communication between each of the plurality of BOTs is established using at least one of an event message service model and one or more communication Application Program Interfaces (APIs) associated with each of the plurality of BOTs.

8. A process automation system for dynamically integrating a plurality of BOTs, the process automation system comprising:

a processor; and a memory communicatively coupled to the processor, wherein the memory stores processor-executable instructions, which, on execution, causes the processor to:

create automatically, the plurality of BOTs offering one or more automated services, wherein each of the plurality of BOTs has a common BOT structure comprising one or more field parameters, wherein the common BOT structure further comprises a frequency of requests to the plurality of BOTs, and wherein the common BOT structure is used to coordinate between the plurality of BOTs with at least one similar functionality for offering the one or more automated services;

assign one or more predefined functions to each of the plurality of BOTs, wherein at least one of the one or more predefined functions comprises a function value;

determine a maturity score for each of the plurality of BOTs based on the one or more field parameters and the function value;

integrate the plurality of BOTs by synchronizing data amongst the plurality of BOTs based on the maturity score, wherein the plurality of BOTs are synchronized when at least one of the maturity score, frequency of requests and time period of the requests associated with one of the plurality of BOTs is higher than a predefined maturity score, predefined frequency of requests and predefined time period of the requests respectively;

reset current function and data values of the frequency of requests to the plurality of BOTs after the synchronization; and dynamically update new function and data values of the frequency of requests to the plurality of BOTs for subsequent requests handled by the plurality of BOTs after the synchronization.

9. The system as claimed in claim 8, wherein the one or more field parameters comprises at least one of a BOT identification (ID) number, BOT name, BOT type, BOT type version, BOT version, BOT group name, BOT state, source file format, source file name, source file path, data version, algorithm used for processing data, BOT status, time period of the requests, reward points and penalty points, last synchronization date, last synchronization status, BOT maturity, publish topics of the BOT, subscription topics of the BOT, last published event message, last received event message, association property, work flow property, source BOT ID, target BOT ID and deploy instance count of the BOT.

10. The system as claimed in claim 8, wherein the instructions cause the processor to assign the one or more predefined functions to each of the plurality of BOTs by updating at least one of the one or more predefined function values upon handling of an event by a BOT from the plurality of BOTs.

11. The system as claimed in claim 10, wherein the one or more predefined functions includes at least one of starting the BOT, stopping the BOT, assembling the BOT, deploying the BOT, detecting the maturity score of the BOT, assigning the maturity score of the BOT, detecting the rank order of the BOT, assigning the rank order of the BOT, verifying the BOT, checking state of the BOT, checking the status of the BOT and assigning the threshold values of frequency, time and total number of the reward points and the penalty points.

12. The system as claimed in claim 8, wherein the instructions cause the processor to determine the maturity score for each of the plurality of BOTs when a number of requests handled by each of the plurality of BOTs individually is higher than a predefined number of requests.

13. The system as claimed in claim 12, wherein the maturity score for each of the plurality of BOTs is determined based on the number of requests handled by each of the plurality of BOTs, the number of reward points and the number of penalty points assigned to each of the plurality of BOTs.

14. The system as claimed in claim 8, wherein each of the plurality of BOTs communicate using at least one of an event message service model and one or more communication Application Program Interfaces (APIs) associated with each of the plurality of BOTs.

15. A non-transitory computer-readable medium storing computer-executable instructions for:
  create automatically, a plurality of BOTs offering one or more automated services, wherein each of the plurality of BOTs has a common BOT structure comprising one or more field parameters, wherein the common BOT structure further comprises a frequency of requests to the plurality of BOTs, and wherein the common BOT structure is used to coordinate between the plurality of BOTs with at least one similar functionality for offering the one or more automated services;
  assign one or more predefined functions to each of the plurality of BOTs, wherein at least one of the one or more predefined functions comprises a function value;
  determine a maturity score for each of the plurality of BOTs based on the one or more field parameters and the function value;
  integrate the plurality of BOTs by synchronizing data amongst the plurality of BOTs based on the maturity score, wherein the plurality of BOTs are synchronized when at least one of the maturity score, frequency of requests and time period of the requests associated with one of the plurality of BOTs is higher than a predefined maturity score, predefined frequency of requests and predefined time period of the requests respectively;
  reset current function and data values of the frequency of requests to the plurality of BOTs after the synchronization; and
  dynamically update new function and data values of the frequency of requests to the plurality of BOTs for subsequent requests handled by the plurality of BOTs after the synchronization.

16. The non-transitory computer-readable medium of claim 15 further storing computer-executable instructions for assigning the one or more predefined functions to each of the plurality of BOTs by updating at least one of the one or more predefined function values upon handling of an event by a BOT from the plurality of BOTs.

17. The non-transitory computer-readable medium of claim 15 further storing computer-executable instructions for determining the maturity score for each of the plurality of BOTs when a number of requests handled by each of the plurality of BOTs individually is higher than a predefined number of requests.

* * * * *